July 31, 1945.  A. L. JOHNSON ET AL  2,380,445
CLUTCH DEVICE
Filed Sept. 23, 1942   4 Sheets-Sheet 1

Fig. 1.

INVENTOR
Albert L. Johnson
BY Selmer A. Kraft
Robert M. Dunning
ATTORNEY

Fig. 2.

Patented July 31, 1945

2,380,445

UNITED STATES PATENT OFFICE 2,380,445

CLUTCH DEVICE

Albert L. Johnson and Selmer A. Kraft, St. Paul, Minn., assignors to Johnson Power-On Transmission Corporation, St. Paul, Minn., a corporation of Minnesota Application September 23, 1942, Serial No. 459,374

19 Claims. (Cl. 192—58)

Our invention relates to an improvement in a clutch device, wherein it is desired to provide a simple and efficient hydraulic clutch.

Various types of hydraulic clutches have previously been constructed. Some types of hydraulic clutches which have heretofore been manufactured have had the disadvantage of locking quickly and with a jerky motion. Other clutches have been found to heat the hydraulic fluid used to operate the same. Other clutches create a surging action which causes the clutch to engage and disengage in intermittent jumps or steps.

It is an object of the present invention to provide a clutch for locking two relatively rotatable members together, or for locking a rotatable member to a stationary member, in which many of the former disadvantages of such devices have been overcome. Our locking device operates smoothly and uniformly, thus avoiding the jerky movements previously encountered. Furthermore, due to the fact that quantities of oil are not forced through pipes or conduits at a high rate of speed and under pressure, the oil is not given an opportunity to heat to an undesirable extent.

A feature of the present invention resides in the provision of a relatively rotatable rotor and casing, and in the provision of vanes on the rotor which are arranged to engage the inner cam surface of the casing. In the rotation of the rotor, these vanes provide a pumping action for liquid between the rotor and the casing. By restricting the outlets from the spaces between the rotor and the casing, a clutching action may be provided which will prevent the relative rotation between the rotor and the casing.

A further feature of the present invention lies in the provision of a reservoir in conjunction with the rotor from which a supply of liquid may be taken when desired. Because of this reservoir the leakage of a small amount of hydraulic liquid from the casing will not change the entire operation of the clutch device.

A further feature of the present invention lies in the provision of a check valve between the supply reservoir and the compression chambers of the clutch. Thus when liquid under pressure is holding the clutch from rotation this pressure can not be transmitted to the reservoir. However, as soon as vacuum exists above the check valve, additional liquid may be drawn into the compression chambers from the reservoir.

A further feature of the present invention lies in the provision of a casing formed with convex or crescent-shaped pockets therein with a bladed rotor supported within the same, and to so arrange the vanes or blades of the rotor and the crescent-shaped pockets of the casing that the pressure on the rotor shaft will be equalized at all times. As a result the pressure acting upon the vanes and rotor will not have a tendency to bend or strain the rotor shaft.

A further feature of the present invention lies in the provision of a casing having a series of concave surfaces therein, and in a rotor having a sufficient number of blades so spaced that one of the blades is in each crescent-shaped pocket at every position of rotation of the rotor.

We have found that the heating of the hydraulic liquid usually results from pumping the liquid under pressure through conduits or liquid passages. This often occurs while liquid is being pumped through a by-pass when the clutch is not engaged. A feature of the present invention resides in the provision of a means for retracting the blades into the rotor when it is so desired. When the blades are retracted, they do not engage the cam surface of the casing but are contained within the rotor. The rotor may then rotate freely within the casing without pumping liquid. Rotary movement between the rotor and casing can then take place without a pumping action. The liquid within the casing is accordingly not heated by the friction resulting from forcing the liquid at high speed and under high pressure through by-passing conduits or pipes.

It is a further feature of the present invention that the blades may be held in retracted position by any suitable means, such as a spring means, and may be extended by hydraulic pressure. Similarly the blades or vanes may be normally urged outwardly against the cam-shaped casing wall by suitable resilient means and may be retracted by hydraulic pressure. Furthermore hydraulic pressure created in one clutch element may be used to project or retract the vanes and blades of a second clutch unit and vice versa.

These and other objects and novel features of our invention will be more clearly and fully set forth in the following specification and claims.

In the drawings forming a part of our specification.

Figure 1:
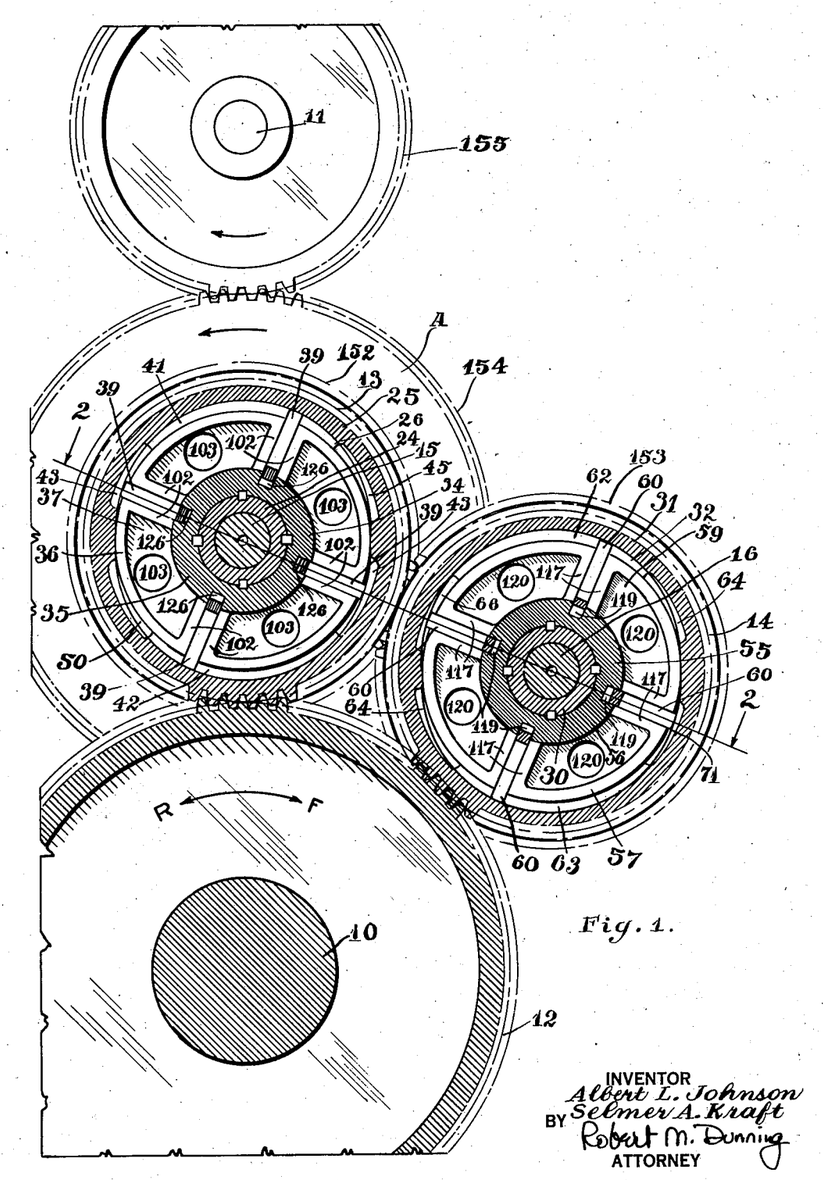
Figure 1 is a sectional view through a reversing gear embodying a pair of clutch units and employed for driving a driven shaft in a single direction regardless of the direction of movement of the drive shaft.
Figure 2:
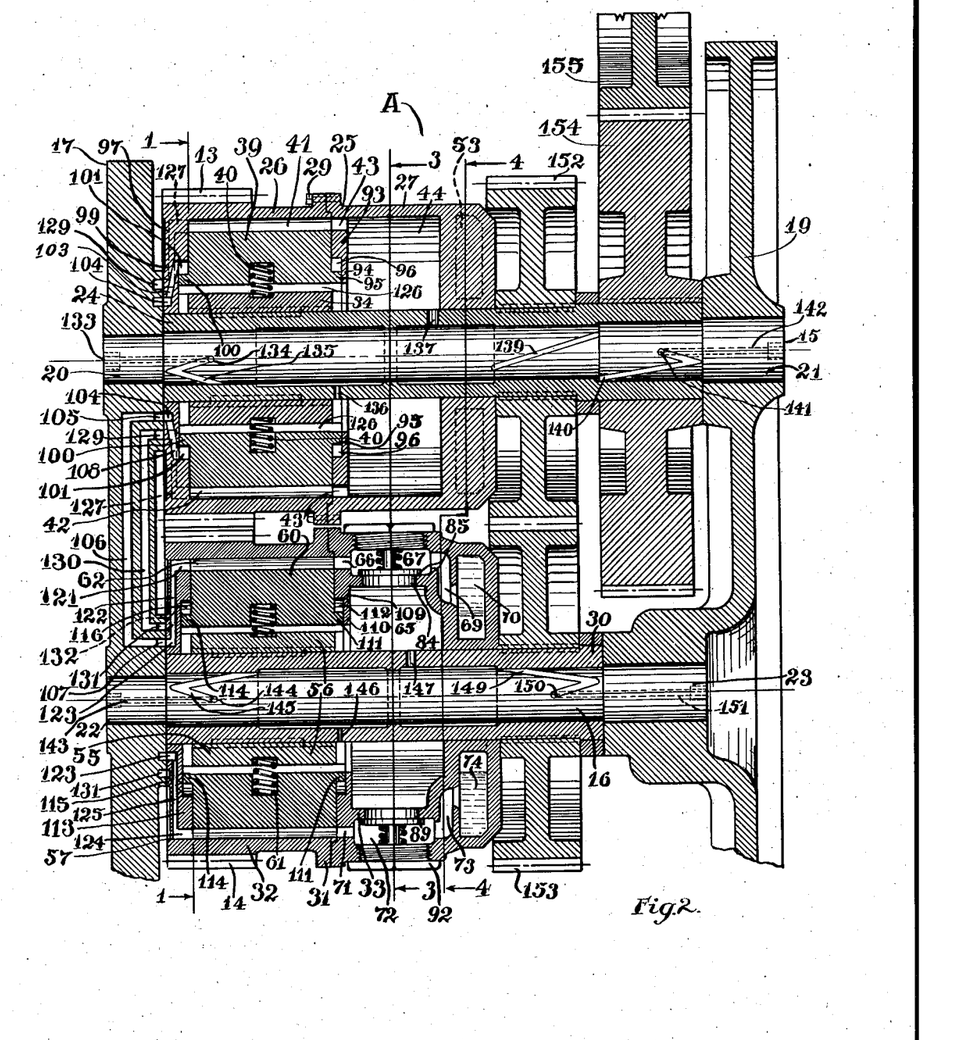
Figure 2 is a sectional view through the clutch units of the reversing gear mechanism shown in Figure 1, the position of the section being indicated by the line 2—2 of Figure 1.
Figures 3, 4, 5:
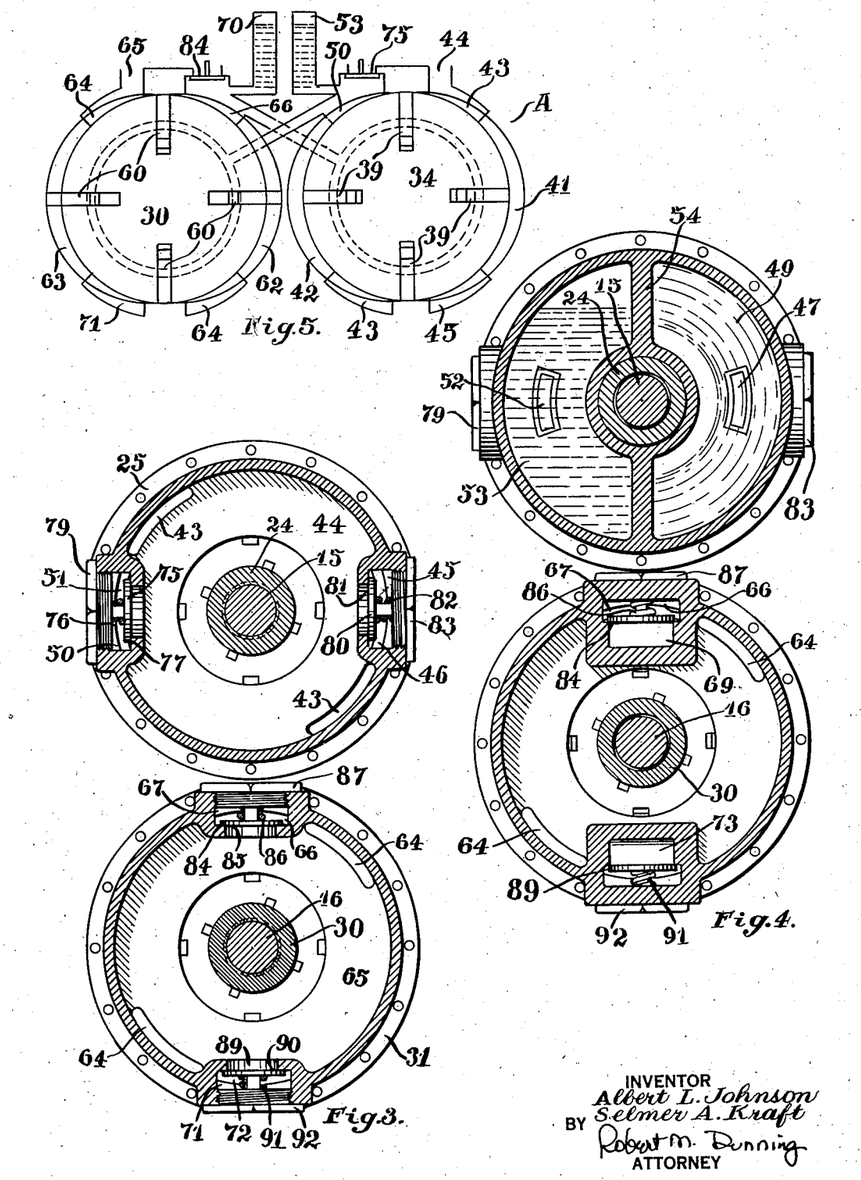
Figure 3 is a sectional view through the reservoir of the clutch units, the position of the section being indicated by the line 3—3 of Figure 2.
Figure 4 is a sectional view through the liquid compartment in conjunction with the clutch units, the position of the section being indicated by the line 4—4 of Figure 2.
Figure 5 is a diagrammatic view showing the principle of operation of the reversing gear mechanism shown in Figures 1 and 2.

The reversing mechanism A, illustrated in Figures 1 and 2 of the drawings and diagrammatically shown in Figure 5 of the drawings, is designed to rotate a driven shaft in a single direction regardless of the direction of rotation of the drive shaft. A drive shaft 10 is connected to any source of power supply, such as the crank shaft of a Diesel engine for example. The driven shaft 11 must rotate in a single direction and may be used for any desired purpose, such as for driving the blower for supplying air to the Diesel engine. Such a use is only illustrative of one task which may be accomplished by the present device.

In order to rotate the shaft 11 the shaft 10 must act through a pair of oppositely operable overrunning clutch units, one of which is set in operation when the drive shaft operates in one direction to transmit power to the driven shaft, and the other of which is set into operation when the drive shaft rotates in the opposite direction so as to transmit power to the driven shaft. The manner in which this desired result may be accomplished will be later described in detail.

Upon the drive shaft 10 is mounted a gear 12 which is secured to the shaft for rotation therewith. The gear 12 is in constant mesh with two spaced gears 13 and 14 respectively. The gears 13 and 14 are mounted for rotation about shafts 15 and 16 respectively, and these gears 13 and 14 are thus directly connected to the drive shaft for rotation at all times.

The shafts 15 and 16 are mounted in parallel relationship and are supported by a pair of stationary frame members 17 and 19. The shape of these frame members 17 and 19 is not important in the present invention and these members merely act as a means of supporting the shafts. The shaft 15 is provided with eccentric ends 20 and 21 which are in axial alignment with one another, but are not axially aligned with the remainder of the shaft 15. As a result by rotation of the shaft 15 the axis thereof may be moved toward or away from the shaft 16. The shaft 16 is also provided with eccentric ends 22 and 23. These ends are axially aligned, but are not coaxial with the shaft 16. As a result by rotation of the shaft 16 the axis thereof may be moved toward or away from the shaft 15. This arrangement is provided in order to compensate for wear and to properly adjust the intermeshing teeth of the cooperating gears supported upon the shafts 15 and 16. A sleeve 24 is rotatably mounted upon the shaft 15. A two-part casing 25 is rotatably supported upon the sleeve 24. The casing 25 includes a clutch compartment 26 and a reservoir compartment 27 secured together by any suitable means, such as the bolts 29.

A sleeve 30 is rotatably supported upon the shaft 16. A two-part casing or housing 31 is rotatably supported upon the sleeve 30. The casing 31 includes a clutch compartment 32 and a reservoir compartment 33 connected together by any suitable means. The casing 25 is provided externally with the gear teeth 13, while the casing 31 is provided externally with the gear teeth 14. The gears 13 and 14 are not in mesh with each other, but are in mesh with the gear 12. Obviously, therefore, the rotation of the drive shaft 10 and the gear 12 mounted thereupon causes rotation of the casings 25 and 31 in one direction or another at all times. Furthermore it is obvious that both of the casings 25 and 31 either rotate in a clockwise direction as viewed in Figure 1 or in a counter-clockwise direction.

A rotor 34 is keyed to the sleeve 24 within the clutch casing 26 to rotate within this casing. As best illustrated in Figure 1 of the drawings, the rotor 34 includes a hub 35 encircling the sleeve 24, a circular peripheral flange 36 of a diameter to closely fit within the casing 26, and connecting web means 37 between the peripheral flange 36 and the hub 35. At angularly spaced intervals, radially slidable blades 39 are provided which are designed to bear against the inner surface of the casing 26. These blades 39, may if desired be urged outwardly by some suitable means, such as by the springs 40 interposed between each blade 39 and the hub 34. The outer edge of each blade is designed to engage the inner wall of the casing 26.

The casing section 26 is provided with a pair of oppositely disposed crescent-shaped pockets 41 and 42. These pockets are so formed that the blades 39 may, by a gradual movement, slide outwardly and then inwardly as the end of the blade passes each crescent-shaped pocket. These blades may therefore force liquid from the crescent-shaped pockets into a suitable outlet port, as will be later described in detail. The pockets are formed by having the periphery of the chamber within the casing section 26 provided with opposed abutments, and having the rotor within the chamber mounted in clearance relation to the periphery of the chamber on opposite sides of the low point of the abutment.

A passage 43 is provided at one end of each of the crescent-shaped pockets 41 and 42 connecting these pockets with the reservoir 44 within the portion 27 of the casing 25. This passage is arranged to provide a free entrance for liquid into the pockets at one end thereof. A passage 45 connects the other end of the pocket 41 through a valve chamber 46 and a connecting passage 47 to a pressure chamber 49. A similar passage 50 connects the other end of the pocket 42 through a valve chamber 51 and an additional passage 52 to the pressure chamber 53. The pressure chambers 49 and 53 are located within the portion 27 of the casing 25 and are separated by a central partition 54. Thus one end of each crescent-shaped pocket 41 and 42 is connected to the common reservoir 44, while the other end of each pocket 41 and 42 is connected to an individual pressure chamber 49 or 53.

A rotor 55 is mounted upon the sleeve 30 and is keyed or otherwise secured thereto. The rotor 55 includes a hub 56 encircling the sleeve 30 and secured thereto, a cylindrical flange 57 designed to closely fit the inner wall of the portion 32 of the casing 31, and a connecting web 59 which connects the hub 56 to the flange 57. A series of blades or vanes 60 are mounted in the rotor 55 for slidable radial movement with respect thereto, and spring means such as 61 may be provided between the hub 56 and each blade 60 to urge the blade outwardly against the inner surface of the casing section 32.

As best illustrated in Figure 1 of the drawings the casing section 32 is provided with a pair of oppositely disposed crescent-shaped pockets 62 and 63 which may contain a liquid between the rotor flange 57 and the inner surface of the casing 31. These pockets 62 and 63 are so shaped that in the rotation of the rotor 55, each successive blade 60 will normally gradually slide outwardly so that the outer edge thereof will bear against the inner casing wall and then will be forced inwardly against tension of the springs 61 by contact with the inner casing wall. Thus during each rotation of the rotor 55 each blade will normally be reciprocated outwardly and then inwardly twice as it successively enters the pockets 62 and 63.

At one end of each of the crescent-shaped pockets 62 and 63 a passage 64 is provided between each pocket and the reservoir 65 within the section 33 of the casing 31. Thus one end of each pocket 62 and 63 is in constant communication with the reservoir 65 and may draw liquid therefrom. As best illustrated in Figures 2 and 3 of the drawings, a passage 66 connects the other end of the pocket 62 with a valve chamber 67 which in turn is connected through the passage 69 to the pressure chamber 70. A similar passage 71 is provided at the other end of the pocket 63 which connects this pocket with the valve chamber 72, which in turn is connected by the passage 73 to the pressure chamber 74. The pressure chambers 70 and 74 are separated by a partition wall similar to the partition wall 54 so that these pressure chambers 70 and 74 are not in communication.

With special reference now to Figure 3 of the drawings, it will be noted that a check valve 75 is urged by a spring 76 into a valve seat 77 in the valve chamber 51 between the pocket 42 and the pressure chamber 53. A cap nut 79 holds the spring 76 in place and permits repair or replacement of the check valve 75. A similar check valve 80 is urged against its seat 81 by a spring 82 held in place by a cap nut 83. The valve seat 81 is located in the valve chamber 46 between the pocket 41 and the pressure chamber 49. When the check valve 75 is open the valve chamber 51 is in communication with the interior of the reservoir 44 so that liquid may enter the valve chamber from the reservoir 44. Similarly when the check valve 80 is in open position the valve chamber 46 is in communication with the reservoir 44 so that liquid may be drawn into the valve chamber from the reservoir. Obviously, however, when pressure exists in the valve chambers 46 or 51 the check valves 75 and 80 remain closed.

A similar construction is provided in the other overrunning clutch unit. A check valve 84 is normally urged against its valve seat 85 by a spring 86 held in place by a cap nut 87. The valve seat 85 is in the wall separating the valve chamber 67 from the reservoir 65. When the check valve 84 is closed no communication is provided between the reservoir and the valve chamber. However, when the check valve 84 is opened liquid may be drawn from the reservoir 65 into the valve chamber 67.

A check valve 89 is provided in the valve chamber 72 and is urged against its seat 90 by a spring 91 held in place by a cap nut 92. When closed the check valve 89 separates the reservoir 65 from the valve chamber 72. When the check valve 89 is open, however, liquid may be drawn into the valve chamber 72 from the reservoir 65.

From the foregoing description it will be apparent that as the casings 25 and 31 rotate relative to the sleeves 24 and 30, the vanes or blades 39 and 60 will be forced outwardly by the springs 40 and 61 respectively, so that the outer edges of the blades follow the contour of the inner surface of the casings. Under certain conditions which will be later described in connection with the operation of the device, it is desirable that the blades 39 and 60 be retracted into the rotors 34 and 55 so that no pumping action will take place during the relative rotation between the rotors and the casings. It will be noted that a partition 93 is provided in the casing 25, which is ring-shaped and which fits with an oil tight seal against one edge of each of the vanes 39. This ring-shaped partition 93 is relatively thick at its outer periphery so as to closely engage the edge of each blade 39. The inner portion of the partition ring 93 is relatively thinner, as indicated at 94, and is designed to contact an end of the hub 34, which hub is relatively wider than the body of the blades 39. Each blade is provided with a shoulder or ledge 95 which projects laterally from the blade at the inner extremity thereof. The end of this ledge or shoulder 95 bears against the thinner portion 94 of the ring-shaped partition 93. This forms a pressure chamber and passage 96 between the ledge 95 and the thicker outer portion of the partition ring 93 for a purpose which will be later described in detail.

The opposite end of each blade 39 bears against the end wall 97 of the section 26 of the casing 25 with an oil tight seal. The end wall 97 is provided with an inner portion 99 of reduced thickness against which the opposite end of the hub 34 may engage with an oil tight seal. A ledge 100 is provided on each blade 39 opposite to the ledge 95 and the end of this ledge or shoulder 100 bears against the thinner portion 99 of the end wall 97 with an oil tight seal. This construction provides a pressure chamber and passage 101 between the ledge 100 and the thicker portion of the end wall 97.

With reference now to Figure 1 of the drawings, it will be noted that the rotor 34 is formed with the cylindrical flange 36 substantially equal in width with the body portion of the blades 39 so that the edges of the flange 36 closely fit between the end wall 97 and the partition ring 93. Radially extending ribs 102 extend from the circular flange 36 to the hub 35 forming a guide for the vanes or blades 39. Openings 103 are provided through the connecting web 37 of the rotor so that pressure is equalized in all of the spaces between the ribs 102, the flange 36 and the hub 35. In other words, the rotor is hollow between the outer cylindrical flange and the hub and the spaces between the various blades 39 and the adjacent guide ribs 102 are connected by the pressure passages 96 and 101 which are formed by the partition wall 93 and the end wall 97, respectively, of the casing 25. By this means pressure is equalized in the hollow spaces between the flange 36 and the hub 35 of the rotor 34.

As best illustrated in Figure 2 of the drawings passages 103 extend through the relatively narrow portion 99 of the end wall 97 and terminate in a ring-shaped groove 104 in the outer surface of the end wall of the casing 25. This groove 104 is in registry with a groove 105 in the fixed support 17. This groove 105 is connected by a passage 106 extending through the fixed support 17 to a ring-shaped groove 107 concentric with the sleeve 30.

The casing 32 is similarly provided with a ring-shaped partition 109 which is designed to fit against one edge of each blade 60 with an oil tight seal, and which is also designed to engage against one edge of the circular flange 57 of the rotor 55. The inner portion 110 of the partition ring 109 is thinner than the outer portion thereof, and this thinner portion 110 is designed to fit snugly against one end of the hub 56 and also to fit against the end of a ledge or shoulder 111 projecting laterally from each blade 60. Thus a ring-shaped passage 112 is provided between the ledge 111 and the thicker portion of the partition ring 109.

The opposite end of each of the blades 60 is designed to bear against the end wall 113 of the casing 32 with an oil tight seal. The opposite edge of the circular flange 57 of the rotor 55 also fits snugly against this end wall 113. The inner portion of the end wall 113 adjacent the sleeve 30 is thinner than the outer portion of this wall so as to accommodate the hub 56 of the rotor 55 which is wider than the body of the blades 60. A ledge or shoulder 114 projects laterally from each blade 60 opposite to the ledge 111 and the end of this ledge 114 also seals against the thinner portion 115 of the end wall 113. This provides a pressure chamber or passage 116 between the ledge 114 and the thicker portion of the end wall 113.

With reference to Figure 1 of the drawings, it will be noted that the rotor 55 includes a cylindrical flange 57 which is connected to the hub 56 by a central web 59, and which is also connected thereto by angularly spaced pairs of ribs 117. These ribs 117 act to guide the vanes or blades 60 to hold them in their proper relation. These ribs 117 are equal in width to the cylindrical flange 57.

The hub 56 is provided with notches 119 positioned between the ribs 117 to receive the inner ends of the blades 60. The web 59 is provided with openings 120 therethrough to equalize the pressure on both sides of the web. The pressure in all of the hollow spaces between the cylindrical flange 57 and the hub 56 is equalized by the chambers or passages 116 and 112 in the end wall 113 and the partition ring 109.

Opposite the passage 66 we provide a passage 121 which is connected by a connecting passage 122 to a circular groove 123 concentric with the sleeve 30 and in registry with the groove 107 in the fixed support 17. Opposite the passage 71 we provide a passage 124 which is connected by the passage 125 in the casing end wall 113 to this groove 123. Thus liquid forced through the passages 121 and 124 and through the connecting passages 122 and 125 may be forced through the grooves 123 and 107, through the passage 106 in the fixed support 17 through the grooves 104 and 105 to the area within the cylindrical flange 36 of the rotor 34. Thus if fluid under pressure is forced through the passage 124 this pressure will be communicated to the interior of the rotor 34 between the hub 35 thereof and the cylindrical flange 36. When such pressure is introduced into the hollow spaces of the rotor and inward force is exerted against the ledges or shoulders 95 and 100, causing the blades 39 to be pulled inwardly into the grooves 126 in the hub 35. As long as this pressure exists within the hollow spaces in the rotor 34 the blades 39 will be retracted compressing the springs 40 which tend to urge the blades outwardly.

In a similar manner a passage 127 is provided opposite to the passages 45 and 50 as indicated in dotted outline in Figure 2 of the drawings, these passages 127 communicating with a groove 129 in the fixed support 17. The groove 129 which is concentric with the sleeve 24 is connected by a passage 130 to a ring-shaped groove 131 in the fixed support 17 concentric with the sleeve 30. As indicated in dotted outline in Figure 2 of the drawings, a passage 132 connects the groove 131 with the space 116 between the hub 56 and the cylindrical flange 57 of the rotor 55, this passage 132 extending through the reduced thickness portion 115 of the end wall 113. Accordingly high pressure transmitted through the passages 127 will be transmitted through the collector ring 129, the passage 130, the ring 131, and the passage 132 to the interior of the rotor 55 between the hub 56 and the flange 57 thereof. This high pressure will tend to press inwardly on the ledges 111 and 114, thereby sliding the blades or vanes 60 inwardly toward the hub 56 of the rotor 55, the inner ends of the blades extending into the notches 119.

In order to maintain the reservoir 44 with a sufficient supply of liquid, oil or other liquid is supplied through a central opening 133 in the shaft 15. This oil travels through a radial opening 134 to the exterior surface of the shaft where it passes through the external groove 135 which acts to lubricate the space between the shaft 15 and the sleeve 24. The sleeve 24 is cut away intermediate its ends and is provided with radial openings 136 therein through which oil may pass by centrifugal force into the reservoir 44. When the pressure in the reservoir 44 equalizes that of the incoming oil, the oil may flow through the opening 137 to the area about the shaft 15, and may be conveyed by external grooves 139 and 140 to the radial opening 141 which communicates with the central passage 142 through the opposite end of the shaft 15.

The shaft 16 is similarly equipped with a central opening 143 leading to a radial opening 144 which permits oil or liquid to be carried by a groove 145 to the relieved portion within the sleeve 30 intermediate the ends thereof. The fluid may flow through a passage 146 into the reservoir 65. Fluid may also flow from the reservoir 65 through the passage 147 and be carried by grooves 149 to the radial opening 150 from which it is carried by the central opening 151 to the other end of the shaft 16. If oil is the fluid used, this oil will act to lubricate the space between the shafts 15 and 16 and the corresponding sleeves 24 and 30, as well as to replenish the oil supply within the reservoirs 44 and 65.

A gear 152 is keyed to the sleeve 24 and is constantly in mesh with a gear keyed to the sleeve 30. The sleeves 24 and 30 are thus forced to rotate in unison and in the opposite direction. A gear 154 is also keyed to the sleeve 24 and this gear 154 is in constant mesh with a gear 155 mounted on the driven shaft 11. Power is thus supplied from the respective units through the gears 154 and 155 to the driven shaft 11.

In the operation of our device, let us first assume that the shaft 10 is rotating in a clockwise direction. For the purpose of clarity, the gear 12 is shown with a double arrow with symbols R and F. R stands for "reverse," while F stands for "forward." The gear 12 on the shaft 10 is accordingly carried in a clockwise direction, acting to rotate the casings 25 and 31 in a counter-clockwise direction.

When the casing 25 is rotated in a counter-clockwise direction the springs 40 are urging the vanes or blades 39 outwardly against the inner surface of the casing 25. Thus these vanes or blades have a tendency to draw liquid from the reservoir through the passage 43 at one end of each of the crescent-shaped pockets 41, due to the partial vacuum created by the movement of each successive blade 39 through the pockets 41 and 42. The liquid in front of each blade 39 in the pockets 41 and 42 is forced toward the outlet passages 45 and 50. As the check valves 75 and 80 are closed by the pressure above the same and by their respective springs holding the check valves normally closed, a pressure is built up in each of the pressure chambers 49 and 53. It will be noted in Figure 4 of the drawings that each of these chambers is almost full of liquid but sufficient air remains in each chamber to cushion the pressure and to permit a considerable pressure to be built up in these chambers.

At the same time a pressure is built up in the chambers 49 and 53, pressure is also transmitted through the pipes 127, the groove 129, the passage 130, and the groove 131 to the hollow spaces within the rotor 55 between the hub 56 and the flange 57 thereof. As has been previously explained this pressure acts against the ledges 111 and 114 on the blades 60, retracting these blades and compressing the springs 61 which would normally tend to urge the blades against the inner surface of the outer casing 31.

The pressure thus built up locks the rotor 34 from rotation with respect to the casing 25 so that the rotor 34 and the sleeve 24 to which it is keyed, rotate in unison with the casing 25 and the gear 13. Thus when the casing 25 is travelling in a counter-clockwise direction, the rotor 34 and sleeve 24 also rotate in a counter-clockwise direction. However, the gear 154 is in mesh with the gear 155 on the driven shaft 11, and as a result the driven shaft 11 is rotated in a clockwise direction.

Therefore, while the casing 25 is rotating in a counter-clockwise direction, the casing 31 is likewise travelling in a similar direction while the gear 153 on the sleeve 30 is being carried in a clockwise direction by its engagement with the gear 152. Therefore the rotor 55 is being carried in a clockwise direction while the casing 31 is being carried in a counter-clockwise direction. This action is not detrimental to the applicant's purposes in view of the fact that the pressures created by the blades 39 within the casing 25 are holding the blades 60 of the rotor 55 in retracted position. As a result the rotor 55 may rotate freely within the casing 31 without pumping liquid and without resistance other than friction.

Let us now consider that the drive shaft 10 is stopped. The casings 25 and 31 are simultaneously stopped due to the gear connection with the drive shaft 10. The driven shaft 11 tends to continue in motion due to inertia. As the casing 25 stops the blades 39 are carried by the rotor 34 toward the ends of the crescent-shaped pockets 41 and 42 at which the passages 43 are located. As a result any liquid in the pockets 41 and 42 is pumped through the passages 43 into the reservoir 44. A suction effect is created, tending to draw fluid from the pressure compartments 49 and 53. As the pressure chambers 49 and 53 are closed a partial vacuum is created in the valve chambers 46 and 51 opening the check valves 75 and 80 and allowing liquid to enter the pockets 41 through these valves and through the passages 45 and 50. Thus while the casing 25 is stopped or is travelling at a slower rate of speed than the rotor 34, liquid will be pumped from the pockets into the reservoir for replenishment in the pockets from the reservoir through the check valves.

When the casing 25 is stopped and the pressure in the pressure chambers 49 and 53 is relieved the reduction in pressure is transmitted through the passages 127, the ring 129, the passage 130, the ring 131 and the passage 132 to the interior of the rotor 55, thus releasing the pressure holding the blades 60 retracted. The springs 61 then urge the blades 60 outwardly into engagement with the inner surface of the walls of the casing 31.

At this point the casing 31 is stopped or is travelling at a reduced rate of speed while the rotor 55 is travelling in a clockwise direction at a relatively higher speed. The blades 60 then tend to force fluid from the pockets 62 and 63 toward the passages 64 which lead back to the supply reservoir 65. A partial vacuum is thus created in the passages 66 and 71 which are connected to individual pressure chambers 70 and 74. The reduction in pressure pulls upon the check valves 84 and 89, thus replenishing the pockets 62 and 63 with liquid from the reservoir 65. In other words, at this point of the operation the fluid is being forced into the reservoir 65 and withdrawn therefrom to supply the pockets 62 and 63. If at this point in the operation, the drive shaft 10 is again started into rotation in a clockwise direction, the same procedure described will again take place, the liquid in the two units by-passing through the reservoir until the speed of the casings 25 and 31 equals the speed of the rotors 34 and 55 therein. If on the other hand, the drive shaft 10 is reversed so as to travel in the opposite direction, an entirely different operation takes place.

When the drive shaft 10 moves in a counter-clockwise direction the casings 25 and 31 are rotated in a clockwise direction. If the driven shaft has been stationary at the time the drive shaft 10 is started in operation in a reverse direction or when the speed of rotation of the casing 31 exceeds that of the rotor 55, the blades 60 tend to force liquid into the passages 66 and 71. The other end of each of the pockets is connected to the reservoir 65 so liquid may be supplied from this reservoir. This action causes a building up of pressure in the pressure compartments 70 and 74 holding the check valves 84 and 89 closed. Simultaneously pressure is transmitted through the passages 121 and 124, through the passages 122 and 125, the rings 123 and 107, the passage 106, the rings 105 and 104, and the passages 103, to the hollow spaces within the rotor 34 between the hub 35 and the cylindrical flange 36 thereof. This pressure within the rotor 34 acts inward against the ledges 95 and 100 of the blades 39, retracting these blades and compressing the springs 40 tending to urge the blades outward. As a result the rotor 34 rotates freely within the casing 25 in a counter-clockwise direction.

As was previously described the casing 25 rotates in a clockwise direction while the rotor 34 operates in a counter-clockwise direction. No difficulty in this arrangement exists, however, as the blades 39 are retracted, allowing free rotation of the rotor within the casing 25.

It will thus be seen that rotation of the drive gear 10 in a counter-clockwise direction tends to cause the rotor 55 to rotate with the casing 31, thus acting through the gears 153 and 152 to rotate the rotor 34 in a counter-clockwise direction as the rotor 34 is mounted on the same sleeve 24 as the gear 152. Rotation of the gear 152 and of the sleeve 24 in a counter-clockwise direction causes simultaneous rotation of the gear 154 in a counter-clockwise direction, thus rotating the gear 155 and consequently the driven shaft 11 in a clockwise direction. Thus it will be noted that regardless of the direction of rotation of the shaft 10, the shaft 11 will be rotated in the same direction.

When rotation of the drive shaft 10 is slowed down or stopped it will be found that the casings 25 and 31 are again travelling at a slower rate of speed than the rotors 34 and 55. This will reverse the tendency for relative rotation between the casings and their respective rotors, and will again cause the by-passing of liquid through the reservoirs 44 and 65, the liquid entering through the check valves 75, 80, 84 and 89.

The manner in which liquid under pressure may be maintained within the hollow spaces of the rotors 34 and 55 is believed obvious from the foregoing discussion. It should be noted in Figure 1 of the drawings that the blades 39 and 60 are at all times partially retracted into the grooves or notches 119 or 126 in their respective hubs 35 and 56. As the various ledges on the blades are coextensive with the hubs it is obvious that no fluid under pressure can pass beneath these ledges, being trapped within the hollow spaces of the rotor. The spaces beneath the various vanes are in communication with the reservoirs 44 and 65 at all times so that there is no tendency for pressure to urge the blades outwardly except the springs 40 and 61 and centrifugal force. This spring and centrifugal force must be overcome by inward pressure against the various ledges.

It should further be noted that the pressure chambers 49 and 53 in the casing 25 and the pressure chambers 70 and 74 in the casing 31 are separated by central partitions such as 54. The reason for this separation is to trap a certain amount of cushioning air within these pressure chambers. It will be noted that the ports 47 and 52 are spaced between the outer circumference of the compartments and the inner closure wall of the same. Thus regardless of the angle at which the compartments come to rest the air within the chambers is not permitted to escape. Thus a cushioning means is provided which acts to cushion the engagement of the clutch and to permit the same to engage gradually.

Figure 6:
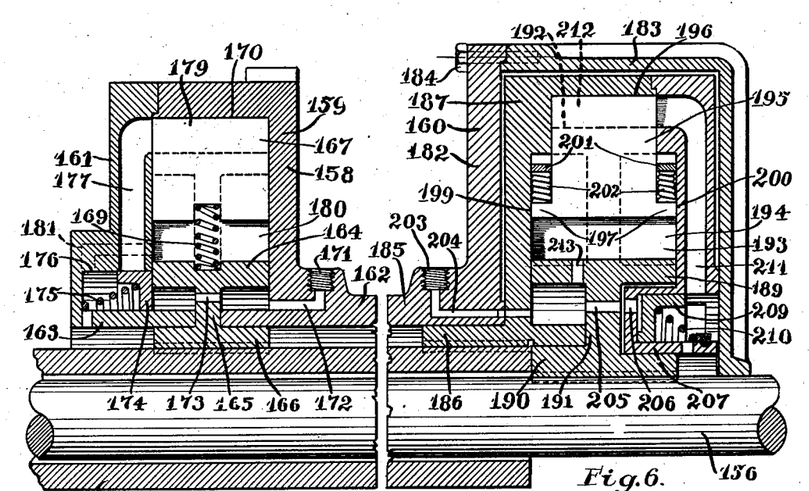
Figure 6 is a sectional view showing one-half of a modified form of clutch device.

In Figure 6 of the drawings we disclose a modified form of construction of clutch. In this construction we disclose a means of rotating two rotatable elements in unison or of holding one or both of said elements stationary, if it is so desired. We provide a shaft 156 upon which is rotatably supported a sleeve 157. A pair of stationary casings 159 and 160 encircle the shaft 156. The casing 159 is formed in two sections 158 and 161 secured together by any suitable means. The section 158 is provided with a hub 162 which is of a size to encircle the sleeve 157 and remain in spaced relation thereto. The portion 161 of the casing 159 is also provided with a hub 163 which is aligned with the hub 162.

A rotor 164 is connected by a flange 165 to a hub 166 which is key connected to the sleeve 157. The rotor 164 includes a series of angularly spaced blades or vanes 167 which are urged outwardly by springs 169. The blades 167 are designed to engage the inner surface 170 of the casing 159, this inner surface 170 being cam-shaped as described in connection with the previous constructions, so that rotary movement of the rotor 164 with respect to the casing 159 acts to reciprocate the blades 167.

A liquid connection 171 is provided which may be connected to any control source of fluid under pressure. A passage 172 connects the connection 171 with a hollow space to either side of the rotor flange 165. Openings 173 through the flange 165 allow the fluid under pressure to be transmitted to both sides of the flange 165. A ring-shaped piston 174 slidably mounted on the hub 163 is arranged to bear against the rotor 164 and is urged into this position by a spring 175. The piston 174 is axially slidable into a cylinder 176 formed in the casing portion 161 adjacent the hub 163. A passage 177 which is normally closed by the piston 174 extends into communication with each end of each crescent-shaped pocket 179 formed within the casing 159.

From the foregoing description it will be obvious that when no pressure is introduced through the connection 171 the rotor 164 will be locked from rotation with respect to the casing 159. This is true because of the fact that the passages at both ends of the pockets 179 are closed by the piston 174 in this position. As a result the blades or vanes 167 can not pump liquid either into or out of the pockets 179, thereby holding the rotor from rotation with respect to the casing.

When pressure is introduced through the opening 171 this pressure is transmitted through the passage 172 to the hollow space within the rotor 164. This pressure is transmitted through the openings 173 and against the piston 174, acting to press this piston to the left as viewed in Figure 6, thereby opening a connection between the inlet and outlet passages 177 leading to opposite ends of the pockets 179. Accordingly the liquid within the pockets 179 may be pumped by the blades 167 out through one passage 177 and into the next inlet passage, thereby merely by-passing liquid about the blades 167. As a result relative rotation may take place between the casing 159 and the rotor 164.

If additional pressure is applied to the connection 171 the piston 174 will be urged into more fully open position and the pressure will be transmitted to the pockets 179. This additional pressure will tend to force the vanes 167 inwardly and further to hold these blades in retracted position as the inward pressure overcomes the outward pressure of the springs 169. The space 180 between the inner end of each blade 167 and the rotor 164 may be relieved of any pressure through one or a series of passages 181 which communicate with the space 180 in the rotation of the rotor with respect to the casing.

It will therefore be seen that with the construction shown at the left of Figure 6 of the drawings, when pressure is introduced to the pockets 179 the liquid within the pockets may be by-passed so that relative rotation between the rotor and casing can take place. However, when additional pressure is applied to the connection 171 the blades or vanes are urged inwardly and the rotor may rotate freely within the casing without pumping liquid.

The casing 160 includes a somewhat different form of construction of clutch. The casing 160 is formed in two casing parts 182 and 183 which are fastened together in any suitable manner, such as by cap screws 184. The casing section 182 includes a hub 185 designed to form a rotatable support for the hub 186 of the rotor casing 187. The hub 186 of the rotor casing 187 is keyed to the sleeve 157 and acts to support the casing 160 which may be stationary.

Within the rotor casing 187 we provide a rotor 189 which is keyed to the shaft 156. The rotor 189 includes a hub 190 from which projects a central disc-shaped flange 191 which supports a peripheral cylindrical flange 192. The flange 192 and the flange 191 are provided with a series of angularly spaced notches 193 which are bounded by guide walls 194 extending to the full width of the inner surface of the casing 187.

A series of blades 195 are positioned in the notches 193 and extend outwardly from the rotor into contact with the inner wall 196 of the casing 187. Each of the blades or vanes 195 is provided with a pair of outwardly projecting ledges 197 designed to extend outwardly into engagement with the side walls 199 and 200 of the rotor casing 187. The walls 199 and 200 are provided with thickened outer extremities so that the body portions of the blades 194 engage against the side walls near the outer extremity of the blades, while the ledges 197 extend against the side walls at the inner ends of the blades.

A pair of rings 201 are provided within the side walls 199 and 200 of the casing 187 positioned outwardly from the ledges 197. Springs 202 are provided between the rings 201 and each of the ledges 197. The springs 202 tend to retract the blades 195 into the rotor out of engagement with the inner surface 196 of the rotor casing 187.

A pressure connection 203 is provided in the hub 185 and is connected by a passage 204 to the interior of the rotor 189. Passages 205 through the web 191 of the rotor permit fluid to be transmitted on both sides of the central web. Passages 206 are provided in the hub portion 207 of the casing 187 so as to transmit pressure to the ring-shaped piston 209 within the hub portion 207 of the casing 187.

The piston 209 is urged to the left as illustrated in Figure 6 of the drawings by a spring 210. A series of passages 211 are provided in the casing 187 extending to opposite ends of the pockets 212 within the casing 187. It is understood that the inner wall 196 of the casing 187 is provided with a series of crescent-shaped pockets into which the blades 195 may extend. In normal position of the piston 209 there is a direct contact between both ends of each pocket 212 through the passages 211. Obviously when the piston 209 is moved to the right sufficiently to close or separate the openings 211 no liquid can flow into or out of the pockets 212 and the rotor 189 is held from rotation with respect to the casing 187.

Accordingly when pressure is introduced through the connection 203 and the passage 204 the piston 209 is forced to the right as viewed in Figure 6, closing the communicating passages 211 between opposite ends of the pockets 212 and therefore causing rotation of the rotor 189 with the casing 187.

This pressure introduced through the connection 203 may also flow through the passage 213 in the rotor 189 so as to enter the notches 193 beneath the blades 195 so as to urge these blades outwardly against the surface 196 of the casing 187. When no pressure is introduced through the connection 203 the springs 202 may retract the blades or vanes 195. When the vanes or blades 195 are retracted the rotor 189 may rotate freely within the casing 187. When some pressure is introduced through the passage 203 the vanes or blades 195 are forced outwardly by pressure, compressing the springs 202. Further pressure introduced through the connection 203 acts to force the piston 209 to the right, closing off the passages 211 and thereby preventing the by-passing of liquid from one end of the pockets 212 to the other. The rotor 189 will then rotate with the casing 187.

Figures 7, 8:
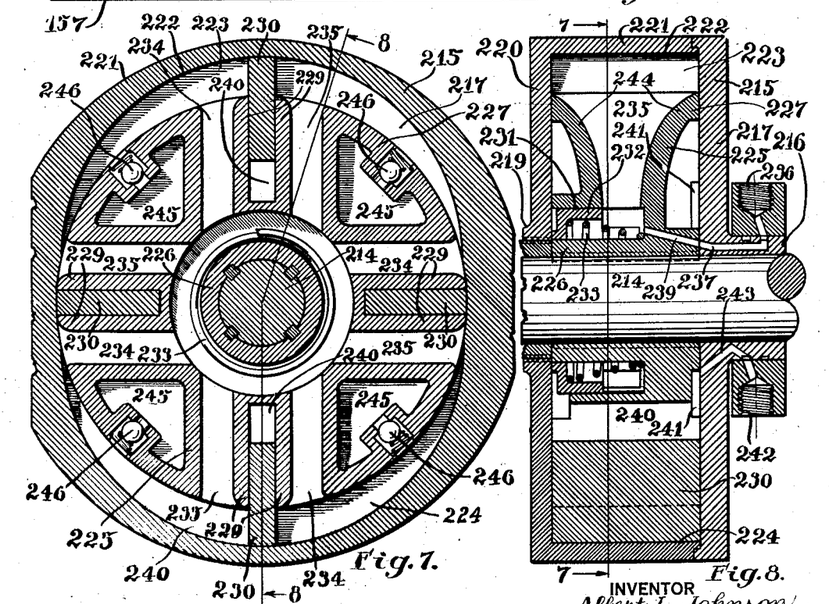
Figure 7 is a cross-sectional view through a modified form of clutch construction.
Figure 8 is a sectional view through the clutch device illustrated in Figure 7, the position of the section being indicated by the line 8—8 of Figure 7.

In Figures 7 and 8 of the drawings we disclose a clutch construction which is similar to the construction which has just been described, but which is somewhat different in construction. In the construction shown in Figures 7 and 8 we disclose a shaft 214 upon which a casing 215 is rotatably mounted. The casing 215 is a two-part casing, one part of the casing comprising a hub 216 and a disc-shaped flange 217 thereupon; and the other casing section including a hub 219, a disc-shaped flange 220 and an integral hollow cylindrical flange 221. The inner surface 222 of the flange 221 is provided with a pair of oppositely disposed crescent-shaped pockets 223 and 224 therein which extend outwardly beyond the periphery of the rotor, revolvable within the casing 215.

The rotor 225 within the casing 215 includes a central hub 226, a hollow cylindrical flange 227, and a series of connecting portions between the hub and the flange. Spaced parallel guides 229 extending the full width of the rotor 225 support reciprocable blades 230 therebetween. The blades 230 are slidable inwardly and outwardly between the guides 229 so that the outer extremities of the blades may engage against the inner surface 222 of the casing flange 221. These blades 230 are capable of pumping liquid into or out of the pockets 223 and 224 in a manner which will be later described in detail.

A cylinder 231 is provided in the hub 226 of the rotor to accommodate a ring-shaped piston 232. This piston 232 is urged in one extreme position by a retarding spring 233. Passages 234 and 235 are provided through the rotor on either side of the guides 229, the shape of the passages 234 being shown in Figure 8 of the drawings. In will be noted that one of these passages is on each side of each of the blades 230. When the piston 232 is in the position shown in Figure 8 of the drawings, and when the blades 230 are in the outer position shown in Figure 7, rotation of the rotor in one direction relative to the casing will force liquid through the passages 234, through a portion of the cylinder 231, and out through the passages 235, the liquid thus by-passing the blades. Rotation of the rotor 225 in the other direction with respect to the casing 215 will force fluid through the passages 235, through a portion of the cylinder 231, and out through the passages 234, thus by-passing the blades 230.

When the piston 232 is in the other extreme position, the passages 234 and 235 are separated one from the other so that no liquid may by-pass about the blades. Accordingly in this position the rotor 225 is locked from rotation with respect to the casing 215.

A liquid connection 236 is provided which is in communication with a passage 237 through the hub 216 of the casing 215. This opening 237 is in communication with passages 239 leading to the right hand side of the piston 232 as viewed in Figure 8 of the drawings. When pressure is applied through the connection 236 and passages 237 and 239, this pressure assists the spring 233 in forcing the piston 232 to the left, allowing liquid to by-pass from one end of the pockets 223 and 224 to the other end thereof. If sufficient pressure is introduced through the connection 236 the blades or vanes 230 will be held retracted by pressure against their outer extremities. The spaces 240 beneath the blades or vanes 230 communicate through grooves 241 formed in the guides 229, as best illustrated in Figure 8.

When it is desired to lock the rotor from rotation with respect to the casing 215, pressure is introduced through the connection 242 which leads through the passage 243 to the interior of the rotor through the grooves 241 and the passage walls 244 defining the passages 234 and 235. This pressure is communicated to the left hand end of the piston 232 as seen in Figure 8, thereby forcing the piston to the right, compressing the retarding spring 233. Previous to movement of the piston 232, however, the pressure introduced through the connection 242 acts against the inner ends of the blades 230 to urge these blades outwardly against the inner surface 222 of the casing 215.

With this clutch construction it will be noted that when pressure is introduced through the connection 236 the piston 232 will be forced to the left to open a connection between opposite ends of the pockets 223 and 224 and subsequently the blades will be held in retracted position by this pressure. When pressure is introduced through the connection 242 the blades 230 will first be forced outwardly into contact with the inner casing wall surface 222 and subsequently the piston 232 will be forced to the left, causing communication between opposite ends of the pockets 223 and 224, and thereby stopping rotation of the rotor 225 with respect to the casing 215.

The hollow portions 245 of the rotor may act as reservoirs to permit the intake of liquid into the pockets 223 and 224, these reservoirs being held normally closed by check valves 236 as shown.

An examination of Figure 1 of the drawings will show that the inlet passages 43 are spaced from the outlet ports 45 a distance just sufficient that one vane 39 will close the inlet just before the next vane 39 opens the outlet. No appreciable compression takes place between two blades in the same crescent-shaped pocket, as the blades are projected substantially the same amount when the inlets 43 are closed as when the outlet ports 45 are opened. Thus, the spaces between adjacent vanes 39 are always in communication with an inlet or an outlet port except for an extremely short portion of the rotation during which the volumes of the spaces do not change appreciably. Thus the oil is not heated by being compressed between two adjacent blades. As one blade passes out of operation the next adjacent blade starts into operation, so that there is only one blade on each side of the rotor in operation at any time. Both rotor units operate similarly but in a reverse direction.

It should also be noted that the inlet and outlet passages are of sufficient size to permit liquid to flow therethrough rather freely when the outlet passages are open. In hydraulic pumps of the vane type, it is desirable to position the outlet as near as possible to the abutment; and increasing the size of the outlet normally decreases the effectiveness of the pump. The restricted size of the outlet normally increases the velocity of the liquid passing therethrough, acting to heat the liquid. In the present construction, however, the outlets are sufficiently large to prevent excessive heating of the liquid.

It is further to be noted that there is no pressure on the blades or vanes as they pass the inlet or outlet ports. This is important as the tendency to quickly stop the relative rotation between the rotor and casing with a sudden jar is obviated.

In every position of the rotor relative to the casing, there is one vane engageable with each crescent-shaped recess. The pressure on the rotor supporting shafts is thus always equalized.

The driven element is not locked from rotation when the drive shaft is stopped, the check valves permitting continued rotation of the driven shaft. If the drive shaft remains motionless, the driven element will gradually stop. If, on the other hand, the drive shaft is again started in either a forward or reverse direction, as the drive picks up speed it will pick up the driven element.

In accordance with the patent statutes, we have described the principles of construction and operation of our clutch device, and while we have endeavored to set forth the best embodiments thereof, we desire to have it understood that obvious changes may be made within the scope of the following claims without departing from the spirit of our invention.

We claim:

1. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, spring means urging said vane outwardly into engagement at its outer end with the periphery of said chamber, and an expansible chamber motor comprising a portion of the vane itself acting as a piston, said motor when subjected to pressure, serving to hold said vane retracted into said rotor.

2. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, each said vane including a laterally extending ledge which, when pressure is applied thereagainst, may retract said vane into the rotor, means for urging said vane outwardly into engagement at its outer end with the periphery of said chamber, and means operable, when actuated, to apply pressure fluid against said ledge to retract said vane into the rotor.

3. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, means for urging said vane outwardly, said rotor having a pressure chamber therein, said vane having a laterally extending ledge thereupon which, when pressure is applied thereagainst, may retract said vane into said rotor, said ledge extending into said pressure chamber to be acted upon by pressure in said pressure chamber.

4. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, means serving alternatively to withdraw said vane into the rotor and to urge said vane outwardly into engagement at its outer end with the periphery of said chamber to release and engage the clutch, a reservoir in communication with said intake port, and a pressure chamber containing liquid and a cushion of air in communication with said outlet port.

5. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, means for urging said vane outwardly into engagement at its outer end with the periphery of said chamber, a reservoir in communication with said intake port, a pressure chamber containing liquid and a cushion of air in communication with said outlet port, and a check valve between said reservoir and said outlet port to admit liquid from said reservoir.

6. A clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in the rotor, means for urging said vane outwardly into engagement at its outer end with the periphery of said chamber, a reservoir in communication with said intake port, a pressure chamber containing liquid and a cushion of air in communication with said outlet port, and a check valve located between said inlet and outlet ports operable when open to by-pass liquid from said inlet to said outlet.

7. A clutch device comprising a drive shaft, a driven shaft, and a clutch connecting said shafts, said clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, a vane slidably mounted in said rotor so as to project therefrom and engage the periphery of the chamber and alternatively to be housed within the rotor, controllable means serving alternatively to retract said vane so that it is housed within the rotor and to urge said vane yieldingly outward into engagement with the periphery of said chamber, a reservoir in said casing in communication with said inlet, a pressure and air chamber in communication with said outlet, means connecting said casing to one of said shafts to rotate therewith, and means connecting said rotor to the other of said shafts to rotate therewith.

8. A clutch device comprising a drive shaft, a driven shaft, and a clutch connecting said shafts, said clutch comprising a casing having a chamber whose periphery includes an abutment, a rotor mounted in said casing in clearance relation to said periphery on opposite sides of the low point of said abutment, there being intake and outlet ports from said chamber on opposite sides of, and adjacent to, said point, means for urging said vane outwardly into engagement with the periphery of said chamber, a reservoir in said casing in communication with said inlet, a pressure and air chamber in communication with said outlet, a check valve between said inlet and said outlet whereby liquid may flow from said inlet to said outlet when said check valve is open, means connecting said casing with one of said shafts to rotate therewith, means connecting said rotor to the other of said shafts to rotate therewith.

9. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

10. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, means selectively operable to hold the vane of either rotor retracted from the periphery of its respective casing chamber, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

11. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, means operable to hold the vane of either rotor retracted from the periphery of its respective casing chamber while the other vane of the other rotor is urged outwardly, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

12. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, a pressure chamber within each rotor, means on each vane operable, when actuated by pressure in said pressure chamber, to retract said vane, said outlet of each casing being connected to the pressure chamber of the rotor in the other casing, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

13. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, a pressure liquid and air chamber connected to each said outlet, a reservoir connected to each said inlet, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

14. A drive including a pair of overrunning clutches, each clutch comprising a casing having a chamber whose periphery includes an abutment, a rotor mounted within said casing in clearance relation to said periphery on opposite sides of the low point of said abutment, there being intake and outlet ports from said chamber on opposite sides of, and adjacent to, said point, a vane slidably mounted in the rotor, means for urging said vane outwardly at its outer end into engagement with the periphery of said chamber, a pressure liquid and air chamber connected to each said outlet, a reservoir connected to each said inlet, a check valve between said pressure chamber and said reservoir so that liquid can be drawn from said reservoir into said outlet, the clutch casing and clutch rotor of each overrunning clutch forming relatively rotatable clutch members which may be locked in one direction of rotation and released in the other direction of rotation, a drive shaft connected to one clutch member of each clutch to rotate the same, and means connecting the other clutch member of each clutch for rotation in unison, one clutch being operable in one direction of rotation of said drive shaft to rotate the other clutch members in one direction, and the other clutch being operable in the other direction of rotation of said drive shaft to operate said other clutch members in the same direction.

15. A clutch comprising a casing having a chamber whose periphery includes an abutment, a rotor mounted in said casing in clearance relation to said periphery on either side of said abutment, there being intake and outlet ports from said chamber on opposite sides of, and adjacent to, said point, a vane slidably mounted in the rotor, spring means normally urging said vane retracted into said rotor, and hydraulically operated means for urging said vane outwardly into engagement at its outer end with the periphery of the casing.

16. A clutch having a casing whose periphery includes a pair of opposed abutments, a rotor mounted in clearance relation to said periphery on opposite sides of the low points of said abutments whereby two working spaces are formed, there being intake and outlet ports from said chamber on opposite sides of, and adjacent said low points, four vanes mounted in the rotor to slide in a general radial direction therein and when projected from the rotor serving as swinging pistons in said working spaces, the dimension and location of the ports being such that one pair of opposed vanes are interposed between the intake and outlet port of respective working spaces while the other pair of vanes are traversing the ports and the interposed abutments.

17. A clutch having a casing whose periphery includes a pair of opposed abutments, a rotor mounted in clearance relation to said periphery on opposite sides of the low points of said abutments whereby two working spaces are formed, there being elongated intake and outlet ports on opposite sides of, and adjacent to, said points, four vanes mounted in the rotor to slide in a general radial direction therein and when projected from the rotor serving as swinging pistons in said working spaces, means urging said vanes outward into contacting relation with the periphery of the casing, the ports being so dimensioned and arranged that one pair of opposed vanes are interposed between the intake and outlet port of respective working spaces while the other pair of vanes are traversing the ports and the interposed abutments.

18. The combination of a drive shaft; a pair of hydraulic clutches for selectively establishing reverse driving connections from said shaft, each of said clutches comprising a hydraulically blocked expansible chamber pump of the rotary type, said pump including retractable abutment-forming vanes and fluid-pressure actuated means for retracting said vanes to render the pump inoperative and thus disengage the clutch; and cross-connections for transmitting the pressure developed by the operation of the pump of each clutch to the pressure-operated vane-retracting means of the other clutch, so arranged that each clutch drives for a corresponding direction of rotation and positively disengages the other clutch.

19. The combination of a drive shaft; a pair of hydraulic clutches for selectively establishing reverse driving connections from said shaft, each of said clutches comprising a hydraulically blocked expansible chamber pump of the rotary type, said pump including retractable abutment-forming vanes and fluid-pressure actuated means for retracting said vanes to render the pump inoperative and thus disengage the clutch; cross-connections for transmitting the pressure developed by the operation of the pump of each clutch to the pressure-operated vane-retracting means of the other clutch, so arranged that each clutch drives for a corresponding direction of rotation and positively disengages the other clutch; and shock relieving means comprising gas filled pockets in communication with respective cross-connections.

ALBERT L. JOHNSON.
SELMER A. KRAFT.